June 6, 1961     A. J. HAMMOND     2,986,769
DECK LID HINGE

Filed June 17, 1959     2 Sheets-Sheet 1

ALBERT J. HAMMOND
INVENTOR.

BY John R. Faulkner
John J. Roethel

ATTORNEYS

United States Patent Office 2,986,769
Patented June 6, 1961

2,986,769
DECK LID HINGE
Albert J. Hammond, Dearborn, Mich., assignor to Ford Motor Company, Dearborn, Mich., a corporation of Delaware
Filed June 17, 1959, Ser. No. 821,001
4 Claims. (Cl. 16—138)

This invention relates generally to hinges for automotive vehicles.

More particularly, the hinge embodying the present invention is adapted to pivotally connect a closure structure, such as a luggage compartment door or the like, to a vehicle body for swinging movement about a substantially horizontal hinge axis, the hinge having incorporated therein a simple and effective latch means for holding the closure structure in an open position.

In recent years the increased size and weight of the deck lid or luggage compartment doors on most vehicles has required the use of hinges incorporating or cooperating with suitable counterbalancing means for retaining the luggage compartment door in an open position. However, hinge structures incorporating or cooperating with counterbalance means such as torsion rods, coil springs or the like, are relatively expensive. The so-called compact or small car bodies now being designed indicate a reversal of the trend of the oversize luggage compartment doors and hoods. With the decrease in size, a reduction in weight is experienced and it is found that it is not necessary to include the expensive counterbalancing means in or coacting with the mounting mechanism for the compartment door or hood. However, it is necessary to incorporate a device effective to maintain the compartment door or hood in an open position.

It is an object of the present invention to provide a simple and efficient hinge of the noncounterbalanced type which incorporates a positive means for holding the compartment closure in an open position, the hold-open means being released by a simple manipulation of the closure, i.e., by raising the closure slightly from its open position.

In its illustrated embodiment, the hinge is adapted to mount a closure on a vehicle body for swinging movement about a substantially horizontal hinge axis. The hinge comprises a fixed hinge member secured to the body and a swingable hinge member secured at one of its ends to the closure and pivoted at the other end to the fixed hinge member. A swingable hold-open device is pivotally mounted on one of said members, preferably the swingable hinge member, for pivotal movement about an axis in spaced relation to the pivot axis of said members. The hold-open device on the one member coacts with a means on the other of said members whereby the hold-open device is swung through a predetermined angular displacement to a closure hold-open position as said closure is swung to a fully opened position. The hold-open device in closure hold-open position is effective to brace the swingable hinge member and thereby said closure in a final open position slightly below the fully opened position. A biasing means is provided which is effective to restore said hold-open device toward its original nondisplaced position upon said closure being first lifted preparatory to closing the same.

Other objects, advantages and features of the present invention will be made more apparent as the description proceeds, particularly when considered in connection with the accompanying drawings, wherein.

Figure 1:
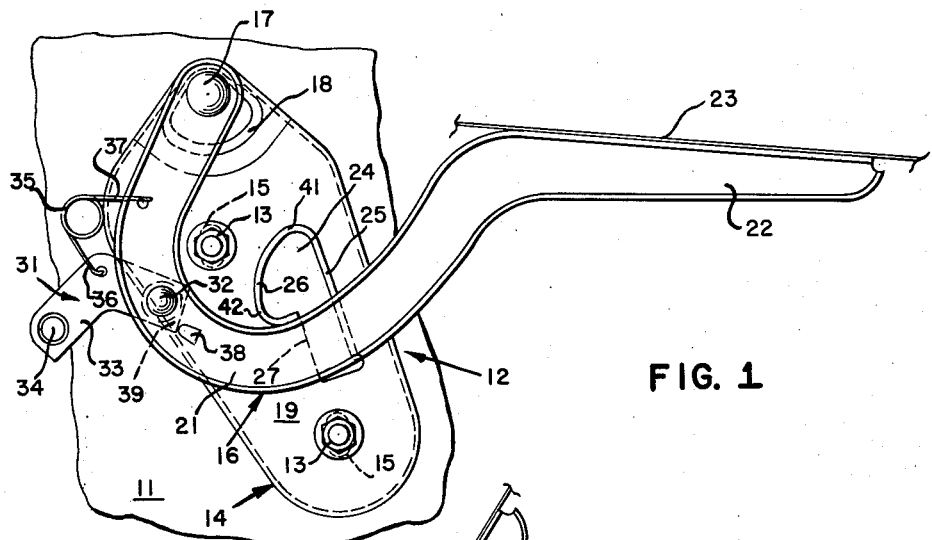
FIG. 1 is a fragmentary longitudinal section of a portion of an automobile body illustrating in elevation the hinge assembly at one side of the vehicle.
Figure 7:
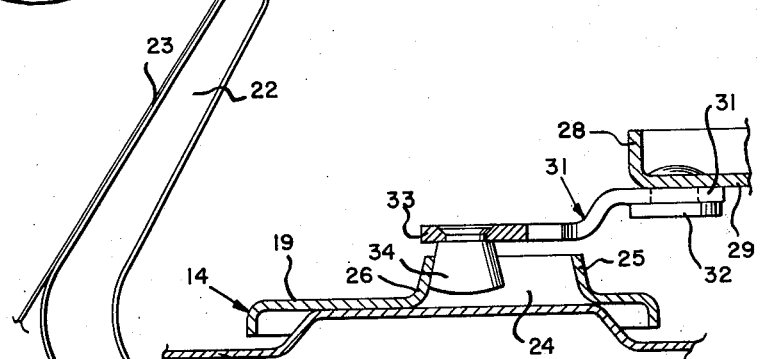
FIG. 7 is a sectional view taken substantially through the line 7—7 of FIG. 6, looking in the direction of the arrows.

Referring now to the drawings, and particularly to FIG. 1, there is indicated at 11 the side body panel of a motor vehicle compartment to which the hinge assembly, generally designated 12, embodying the present invention is adapted to be fastened or secured by bolts 13 or the like. It will be understood that the closure is supported on two hinge assemblies 12, one on each side of the compartment opening. Inasmuch as the two hinge assemblies are of symmetrical construction, only one will be described in detail.

The hinge assembly 12 comprises a fixed hinge member bracket or mounting plate 14 which is illustrated as being of generally oval shape with the longitudinal axis extending in a substantially vertical direction. The bracket or mounting plate 14 is provided with elongated apertures or slots 15 receiving the bolts 13 and thereby providing means for vertical adjustment. A movable hinge member or gooseneck arm, generally designated 16, is pivotally connected to the bracket or mounting plate 14 by means of a rivet, pivot stud or the like 17, at the upper end of the bracket or mounting plate 14. The arm is formed of a channel shaped cross section for structural reinforcement. The bracket 14 is embossed at 18 so that except at the embossed area the arm is spaced from the surface of the main plate portion 19 of the bracket as it swings in the plane parallel thereto. As will be noted, the arm 16 is provided with a gooseneck section 21 and a substantially straight section 22. The straight section of the arm is adapted to be bolted, welded or otherwise secured to a web or reinforcing panel 23 of the compartment closure lid (not shown).

It will be noted that the bracket main plate portion 19 is provided with an elongated slot 24 extending substantially parallel to the longitudinal or substantially vertical axis of the bracket 14. As viewed in FIG. 1, the slot appears to have the general shape of the letter P with the loop portion facing in the wrong direction. Along the long vertical leg of the slot it is provided with a straight flange 25, which flange blends into a curved flange 26 continuing around the loop of the slot to the short straight edge 27 thereof.

It will be noted that the side walls 28 of the channel shaped arm 16 face away from the bracket 14 so that the flat side 29 of the arm faces or opposes the surface of the main plate portion 19 of the bracket 14.

An angularly shaped lever, generally designated 31, is pivotally mounted by means of a shoulder stud 32 or the like to the arm 16 in abutting relation to the flat face 29. It will be noted that the lever 31 is mounted on the arm 16 near the left end of the gooseneck as viewed in FIG. 1, the pivot axis of the lever being spaced from the pivot axis of the arm 16. At its free end 33 the lever 31 is provided with a pin 34 which may be in a form of a roller mounted on a stud riveted to the end of the lever or a fixed bearing means. A toggle spring 35 is provided having the end portion of one leg 36 thereof hooked into an aperture in the arm 16 and the end portion of the other leg 37 hooked into an aperture in the lever 31 at the junction of the two leg portions of the latter. As seen in FIG. 1, the toggle spring continually tends to urge the lever 31 in a counterclockwise direction of rotation about its pivot axis, the shoulder stud 32. A suitable stop 38 lanced out of the arm flat side 29 is provided which stop is in abutting relation to the end 39 of the lever 31.

Figure 2:
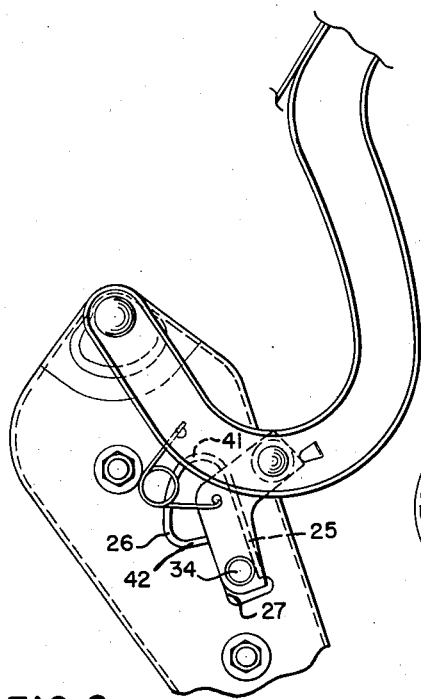

The foregoing has described the physical structure of the hinge embodying the present invention. The operation of the hinge is as follows:

In FIG. 1, the parts of the hinge are illustrated as they appear with the compartment closure structure in a closed position. To attain access to the compartment, it is necessary to raise the free end of the lid of the compartment so that it swings about the generally horizontal hinge axis comprising the two pivot studs 17. As viewed in the drawings, as the compartment lid is raised the arm 16 is swung in a counterclockwise direction. As the arm 16 swings in this direction, the pin 34 will move in an arc around the hinge center 17. In other words, there will be no relative movement between the lever 31 and the hinge arm 16 until the pin 34 abuts the lower end of the flange 25 of the slot 24. The attainment of this position is illustrated in FIG. 2.

Figure 3:
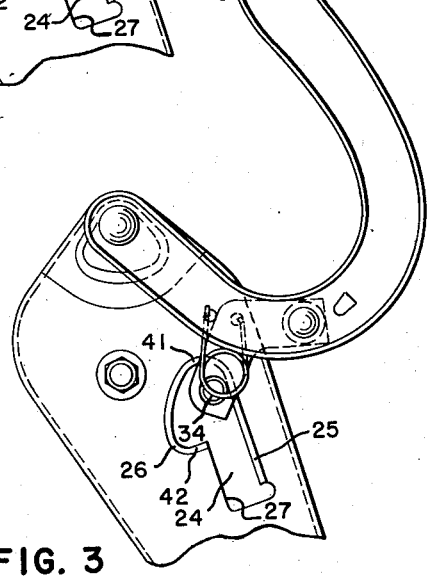

As the hinge arm 16 continues its upward swinging movement the pin 34 will be in engagement with the flange 25 and will move upwardly therealong. The result is that the lever 31 will be swung in a clockwise direction about the pivot stud 32 relative to the arm 16. As this occurs, the toggle spring 35 will be placed under compression, that is, the legs 36 and 37 thereof will be brought closer together. The toggle spring will also bodily swing in a downward direction. Until the pin 34 reaches the position shown in FIG. 3, the toggle spring 35 will be tending to turn the lever 31 counterclockwise on the hinge arm 16. When the FIG. 3 position is reached, the force exerted by the spring 35 will be substantially in a line with the lever pivot 32. In other words, a line drawn through the ends of the two legs 36 and 37 of the spring at their points of connection to the arm 16 and lever 31 will intersect the center of the pivot stud 32. Thus, at this point the spring exerts no force couple tending to rotate the lever 31 around its pivot 32.

Figure 4:
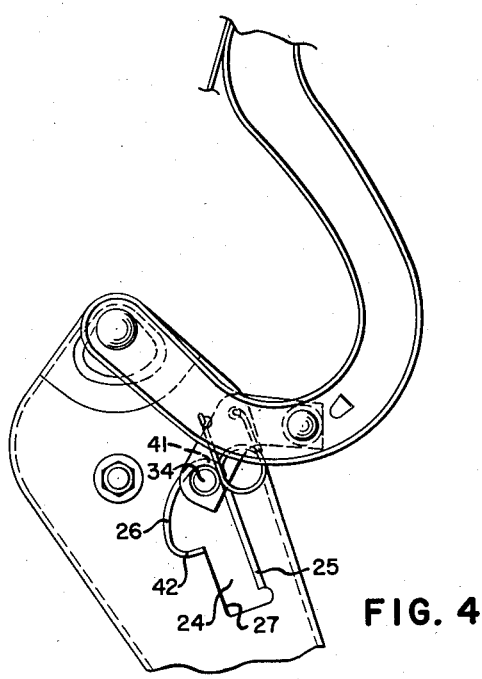

Continued upward movement of the compartment lid causes the pin 34 to move into the corner 41 of the slot 24. This is illustrated in FIG. 4. At this point further upward movement of the hinge arm 16 and therefore of the compartment lid is prevented, as will be readily apparent. It will be noted that at this point a line drawn through the ends of the two spring legs lies on the opposite side of the center of the pivot of the lever 31. Accordingly, the toggle spring 35 is now tending to revolve the link in a clockwise direction around its pivot.

Figure 5:
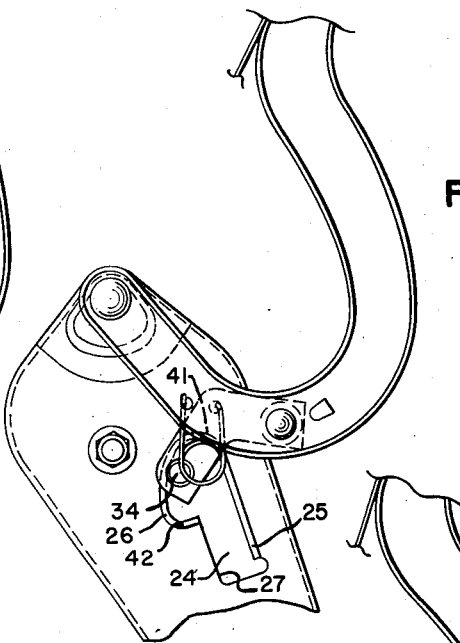

When the positive stop is reached, as illustrated in FIG. 4, the person raising the compartment lid will naturally tend to discontinue exerting lifting force on the free end thereof. Accordingly, the closure of the compartment will be permitted to drop down slightly. Since the spring 35 is tending to rotate the lever 31 in a clockwise direction about its pivot, the slight lowering movement of the hinge arm 16 results in the pin 34 following the curved portion 26 of the slot 24. The pin 34 will follow around the curved portion of flange 26 toward the position indicated in FIG. 5. When this position is reached, the spring force is again in line with the center of the pivot stud 32.

Figure 6:
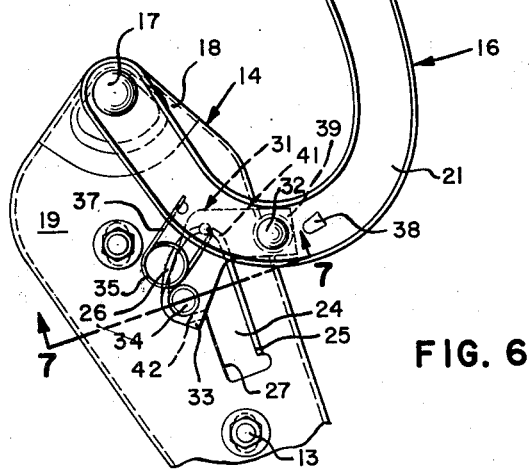
FIGS. 2, 3, 4, 5 and 6 are fragmentary views, in part similar to FIG. 1, illustrating the compartment closure hinge components in the various positions assumed as the compartment closure is moved from a closed to an opened position.

Continued lowering of the compartment lid and therefore of the hinge arm 16 causes the pin 34 to reach a position in which it is seated in a pocket 42 of the slot 24. It will be noted that the spring force is now counterclockwise around the pivot 32. This final position is illustrated in FIG. 6. The FIG. 6 position constitutes the "hold-open" feature of the hinge. Since the spring force is not sufficient to lift the hinge and the compartment lid, the weight of the latter will retain the pin 34 in the lower corner 42 of the flange 26. In effect, the lever 31 is then propping up the hinge arm 16 and therefore holding the compartment lid in an open position.

To lower the compartment lid from its opened position, it is necessary to lift it slightly so that the hinge arm 16 is raised a sufficient distance to permit the pin 34 to clear edge 43 of the slot 24. As soon as this clearance is obtained, the spring 35 is effective to rotate the pin 34 past the flanged corner 43 and return it to the straight portion 25. The compartment lid through the hinge arm 16 may now be completely lowered. The pin 34 will first slide down the flange 25 to its original position illustrated in FIG. 2. As the downward swinging movement of the compartment lid and hinge arm 16 continues the pin will be carried back to its original position as illustrated in FIG. 1.

It will be understood that the invention is not to be limited to the exact construction shown and described, but that various changes and modifications may be made without departing from the spirit and scope of the invention, as defined in the appended claims.

What is claimed is:

1. A hinge and hold-open device comprising a support member and an arm member pivotally connected thereto, a hold-open means pivotally mounted on one of said members for swinging movement about a pivot axis spaced from the pivot axis of said arm member, over-center spring means normally urging said hold-open means in a first direction about its pivot axis, and control means on the other of said members having a first portion engaged by said hold-open means upon said arm member being swung in a hinge opening direction, said hold-open means upon engagement with said first portion being swung in a direction counter to the urging of said spring means, said spring means passing over-center as said arm member reaches substantially full hinge open position to thereby reverse its action on said hold-open means, said control means having a second portion engaged by said hold-open means as said arm member is permitted to drop down after having been moved to the full hinge open position, said second portion terminating in a blocking portion permitting only limited drop down of said arm member, said over-center spring means during engagement of said hold-open means during said limited drop down again passing through its dead center position to thereby urge said hold-open means in said first direction, said spring means being effective upon said arm member again being raised toward its full hinge open position, preparatory to being lowered, to move said hold-open means out of alignment with said blocking portion.

2. A hinge and hold-open device comprising a support member and an arm member pivotally connected thereto, a hold-open means pivotally mounted on said arm member for swinging movement about a pivot axis spaced from the pivot axis thereof, over-center spring means interposed between said arm member and hold-open means normally urging the latter in a first direction about its pivot axis, and control means on said support member having a first portion engaged by said hold-open means upon said arm member being swung in a hinge opening direction, said hold-open means upon engagement with said first portion being swung in a direction counter to the urging of said spring means, said spring means passing over-center as said arm member reaches substantially full hinge open position to thereby reverse its action on said hold-open means, said control means having a second portion engaged by said hold-open means after reversal of the spring action thereagainst as said arm member is permitted to drop down after having been moved to the full hinge open position, said second portion terminating in a blocking portion engaged by said hold-open means permitting only limited drop down of said arm member, said over-center spring means being effective to restore said hold-open means toward first portion engaging position upon said arm member first being raised toward full hinge open position preparatory to said arm member being lowered to full hinge closed position.

3. A hinge and hold-open device comprising a support member and an arm member pivotally connected thereto, a hold-open means pivotally mounted on said arm member for swinging movement about a pivot axis spaced from the pivot axis thereof, over-center spring means interposed between said arm member and hold-open means normally urging the latter in a first direction about its pivot axis, and control means on said support member having a first portion engaged by said hold-open means upon said arm member being swung in a hinge opening direction, said hold-open means upon engagement with said first portion being swung in a direction counter to the urging of said spring means, said spring means passing over-center as said arm member reaches substantially full hinge open position to thereby reverse its action on said hold-open means, said control means having a second portion engaged by said hold-open means after reversal of the spring action thereagainst as said arm member is permitted to drop down after having been moved to the full hinge open position, said second portion terminating in a blocking portion permitting only limited drop down of said arm member, said over-center spring means during engagement of said hold-open means during said limited drop down again passing through its dead center position to thereby urge said hold-open means in said first direction, said spring means being effective upon said arm member again being raised toward its full hinge open position preparatory to being lowered to move said hold-open means out of alignment with said blocking portion.

4. A hinge for mounting a closure on a vehicle body for swinging movement about a fixed hinge axis, comprising a fixed hinge member secured to said body, a movable hinge member secured at one end thereof to said closure and pivoted at the other end thereof to said fixed hinge member, a swingable hold-open means pivotally mounted on said movable hinge member for movement about a pivot axis in spaced relation to said fixed hinge axis, over-center biasing means extending between said movable hinge member and said hold-open means holding the latter in a predetermined position on said movable hinge member, and control means on said fixed hinge member having a first portion engaged by said hold-open means to swing the latter through a predetermined angular displacement to a closure hold-open position as said closure is opened, said control means having a second portion abutted by said hold-open means and against which the latter braces said movable hinge member in a retained open position slightly below its maximum open position, said over-center biasing means urging said hold-open means out of abutment to said control means second portion toward said predetermined position upon said closure being lifted preparatory to closing the same.

References Cited in the file of this patent

UNITED STATES PATENTS 2,671,928    Bright _____ Mar. 16, 1954